US012798422B2

(12) United States Patent
Sugiyama

(10) Patent No.: US 12,798,422 B2
(45) Date of Patent: Nov. 17, 2026

(54) CHARGE CONTROL DEVICE FOR ELECTRIC VEHICLE

(71) Applicant: TOYOTA JIDOSHA KABUSHIKI KAISHA, Toyota (JP)

(72) Inventor: Midori Sugiyama, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 676 days.

(21) Appl. No.: 18/228,763

(22) Filed: Aug. 1, 2023

(65) Prior Publication Data

US 2024/0042883 A1 Feb. 8, 2024

(30) Foreign Application Priority Data

Aug. 3, 2022 (JP) ................................ 2022-124354

(51) Int. Cl.
*B60L 53/63* (2019.01)
*B60L 53/62* (2019.01)
*B60L 58/12* (2019.01)
*B60L 53/30* (2019.01)

(52) U.S. Cl.
CPC ............... *B60L 53/62* (2019.02); *B60L 58/12* (2019.02); *B60L 53/305* (2019.02); *B60L 53/63* (2019.02); *B60L 2240/62* (2013.01); *B60L 2240/72* (2013.01); *B60L 2240/80* (2013.01)

(58) Field of Classification Search
CPC ........ B60L 53/62; B60L 58/12; B60L 53/305; B60L 53/63; B60L 2240/62; B60L 2240/72; B60L 2240/80; B60L 2260/50; B60L 53/67; B60L 53/68; Y02T 10/70; Y02T 10/7072; Y02T 90/12
USPC ........................................................ 320/104
See application file for complete search history.

(56) References Cited

U.S. PATENT DOCUMENTS

| | | | | |
|---|---|---|---|---|
| 2012/0200256 A1* | 8/2012 | Tse | B60L 53/14 | 320/109 |
| 2012/0253567 A1* | 10/2012 | Levy | B60L 53/63 | 701/22 |
| 2015/0039391 A1* | 2/2015 | Hershkovitz | G06Q 30/0202 | 705/7.31 |
| 2019/0275893 A1* | 9/2019 | Sham | B60L 58/12 | |
| 2021/0155111 A1* | 5/2021 | Ni | B60L 53/68 | |

FOREIGN PATENT DOCUMENTS

| | | | |
|---|---|---|---|
| JP | 2013-015424 A | 1/2013 | |
| JP | 2018-074815 A | 5/2018 | |
| JP | 2019-096103 A | 6/2019 | |
| KR | 102467920 B1 * | 11/2022 | H04W 4/023 |

* cited by examiner

*Primary Examiner* — Julian D Huffman
*Assistant Examiner* — Lisa Kotowski
(74) *Attorney, Agent, or Firm* — Dinsmore & Shohl LLP

(57) ABSTRACT

A charge control device for an electric vehicle includes a processor having hardware. Further, the processor limits, when there is another electric vehicle that is likely to be charged within a predetermined range from a charging stand, a target charging amount of the electric vehicle by the charging stand to less than a charging amount at which charging efficiency decreases.

1 Claim, 5 Drawing Sheets

CHARGE CONTROL DEVICE FOR ELECTRIC VEHICLE

CROSS-REFERENCE TO RELATED APPLICATION(S)

The present application claims priority to and incorporates by reference the entire contents of Japanese Patent Application No. 2022-124354 filed in Japan on Aug. 3, 2022.

BACKGROUND

The present disclosure relates to a charge control device.

Japanese Laid-open Patent Publication No. 2019-096103 discloses a vehicle management system in which a minimum charging amount is set in accordance with a travel plan for each vehicle in order to avoid congestion due to charging. In this technique, automatic driving is used to move a vehicle that has been charged from a charging area to a charge management area and move the next vehicle from a standby area to the charging area, thereby charging vehicles efficiently.

SUMMARY

There is a need for providing a charge control device for an electric vehicle capable of avoiding congestion due to charging.

According to an embodiment, a charge control device for an electric vehicle includes a processor having hardware. Further, the processor limits, when there is another electric vehicle that is likely to be charged within a predetermined range from a charging stand, a target charging amount of the electric vehicle by the charging stand to less than a charging amount at which charging efficiency decreases.

DETAILED DESCRIPTION

Figure 1:
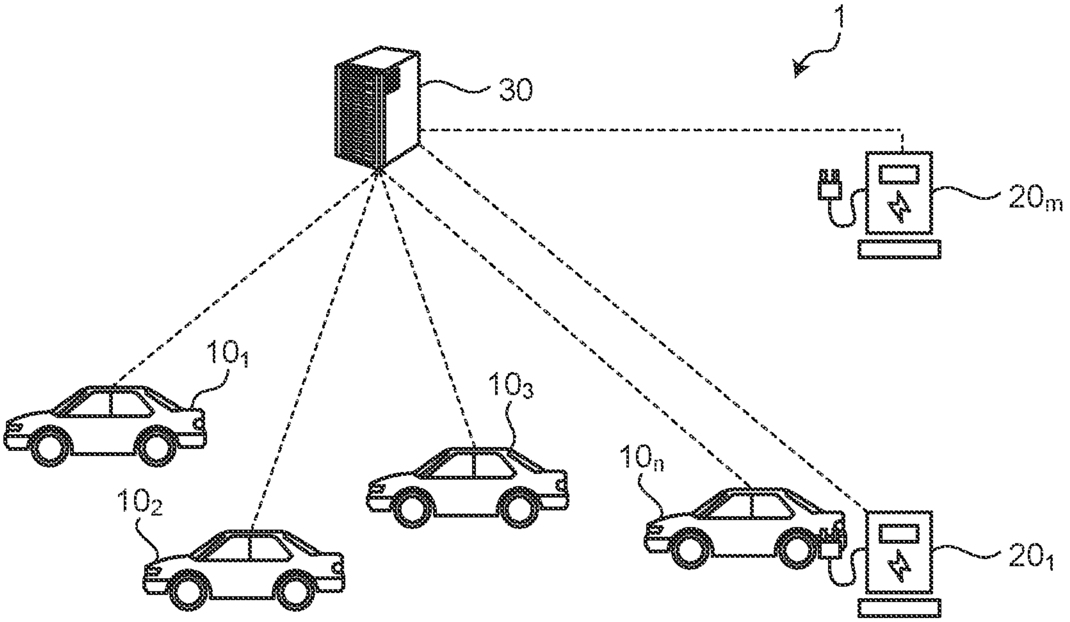
FIG. 1 is a diagram illustrating a schematic configuration of a charging system according to an embodiment.

In the related art, in Japanese Laid-open Patent Publication No. 2019-096103 described above, in the case of a vehicle whose travel plan is a long distance, there is a possibility that congestion for waiting for charging occurs due to a long charging time.

Hereinafter, a charge control device for an electric vehicle according to an embodiment of the present disclosure will be described with reference to the drawings. Note that the present disclosure is not limited to the following embodiment. In the following description, the same portions are denoted by the same reference numerals.

Schematic Configuration of Charging System

FIG. 1 is a diagram illustrating a schematic configuration of a charging system according to an embodiment. A charging system 1 illustrated in FIG. 1 includes a plurality of electric vehicles $\mathbf{10}_1$ to $\mathbf{10}_n$ (n=integer of four or more) (hereinafter, when referring to any of the plurality of electric vehicles $\mathbf{10}_1$ to $\mathbf{10}_n$, it is simply referred to as "electric vehicle 10"), a plurality of charging stands $\mathbf{20}_1$ to $\mathbf{20}_m$ (m=integer of two or more) (hereinafter, when referring to any of the plurality of charging stands $\mathbf{20}_1$ to $\mathbf{20}_m$, it is simply referred to as "charging stand 20"), and a charge control device 30 capable of communicating with the electric vehicle 10 and the charging stand 20 via a network N100. The network N100 is configured of, for example, the Internet line network, a mobile phone line network, or the like. In addition, while FIG. 1 describes a case where there is one electric vehicle 10 and one charging stand 20 to simplify the description, the present disclosure is not limited thereto, and is also applicable to a case where there is a plurality of electric vehicles 10 and a plurality of charging stands 20.

The electric vehicle 10 is implemented using either a plug-in hybrid electric vehicle (PHEV) or a battery electric vehicle (BEV).

The charging stand 20 charges electric power of the electric vehicle 10. Under the control of the charge control device 30, the charging stand 20 charges the electric vehicle 10 and acquires the SoC of the electric vehicle 10 being charged, and outputs the acquired SoC of the electric vehicle 10 to the charge control device 30. Note that the charging stand 20 is not limited to a fixed type, and can also be applied to a mobile vehicle that can be towed by a predetermined vehicle at the time of disaster or the like, or a self-propelled vehicle, for example.

The charge control device 30 is configured using a server or the like, and controls charging of the electric vehicle 10 by each of the charging stands $\mathbf{20}_1$ to $\mathbf{20}_m$. Specifically, in a case where the electric vehicle 10 sets the destination to a predetermined charging stand 20 for power supply, when there is another electric vehicle 10 that is likely to be charged within a predetermined range, such as within a radius of 5 km from the charging stand 20, and congestion due to charging is predicted, the charge control device 30 controls the charging stand 20 so as to limit the target charging amount of the electric vehicle 10 by the charging stand 20 to less than a charging amount at which the charging efficiency decreases.

Functional Configuration of Charging System

Figure 2:
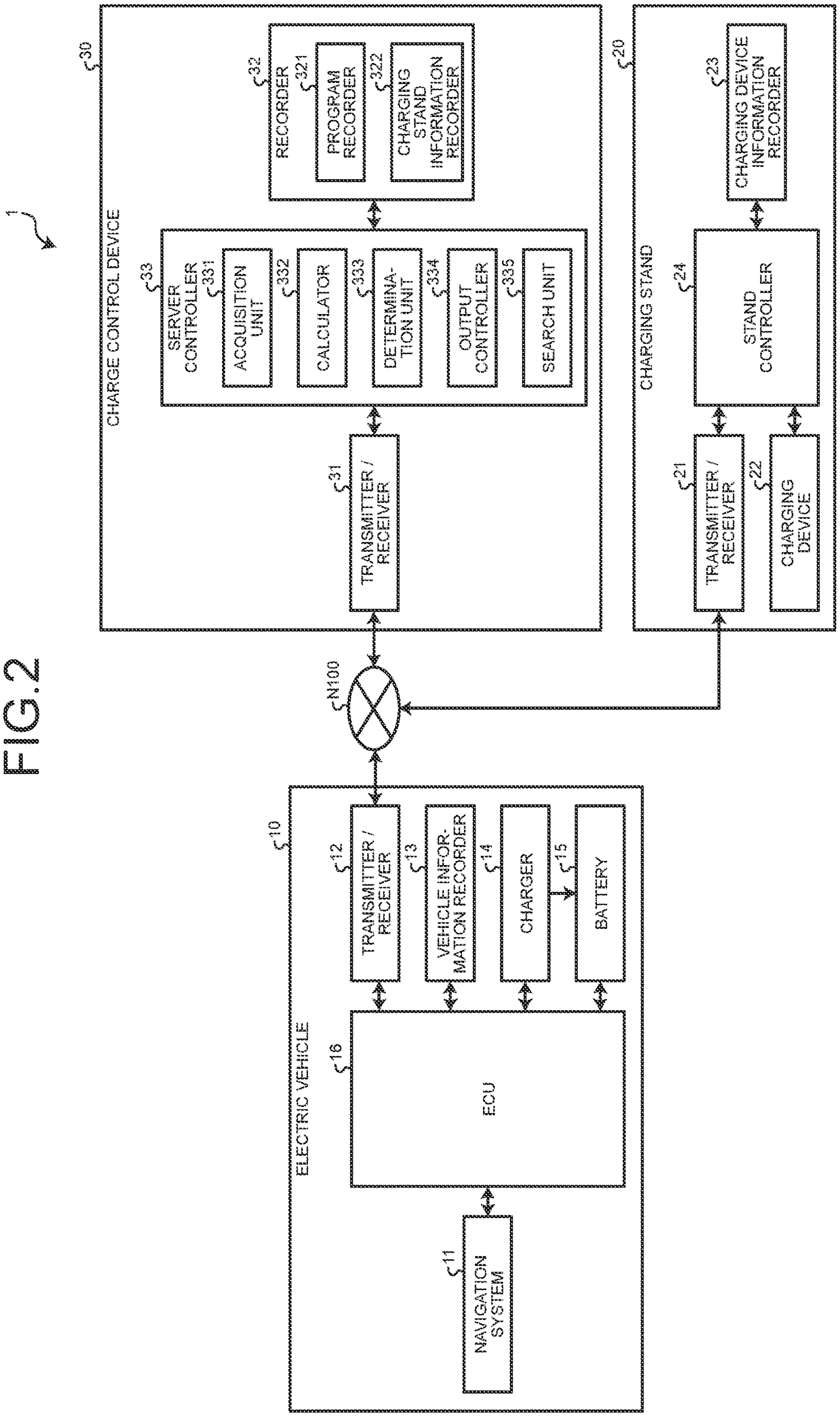
FIG. 2 is a block diagram illustrating a functional configuration of the charging system according to the embodiment.

FIG. 2 is a block diagram illustrating a functional configuration of the charging system 1. Note that in FIG. 2, in order to simplify the description, a functional configuration of one electric vehicle 10 and one charging stand 20 will be described.

Configuration of Electric Vehicle

First, a configuration of the electric vehicle 10 will be described. The electric vehicle 10 includes at least a navigation system 11, a transmitter/receiver 12, a vehicle information recorder 13, a charger 14, a battery 15, and an electronic control unit (ECU) 16.

The navigation system 11 includes a global positioning system (GPS) sensor that receives signals from a plurality of GPS satellites or transmission antennas and calculates position information regarding the position (longitude and latitude) of the electric vehicle 10 on the basis of the received signals, a map database that records various types of map data, a notification device that displays images, maps, videos, and character information and generates sounds such as voice or warning sounds, and an operation unit that receives input of a user's operation and outputs a signal corresponding to the received various types of operation contents to the ECU 16. The navigation system 11 is implemented by using a storage medium such as a hard disk drive (HDD) or a solid state drive (SSD), a liquid crystal or organic electro luminescence (EL) display, a speaker, a touch panel, a button, a switch, a jog dial, and the like.

Under the control of the ECU 16, the transmitter/receiver 12 transmits various types of information to the charge control device 30 and receives various types of information from the charge control device 30 via the network N100. Specifically, the transmitter/receiver 12 transmits vehicle information regarding the electric vehicle 10 to the charge control device 30 under the control of the ECU 16. Here, vehicle information includes position information regarding a current position of the electric vehicle 10, identification information for identifying the electric vehicle 10, destination information regarding a destination of the electric vehicle 10 set in the navigation system 11, and charge state information regarding a charge state such as a state of charge (SoC) of the battery 15 of the electric vehicle 10. The transmitter/receiver 12 is configured using a communication module or the like capable of transmitting and receiving various types of information.

The vehicle information recorder 13 records identification information for identifying the electric vehicle 10, identification information for identifying a program executed by the electric vehicle 10 and the electric vehicle 10, and the like. The vehicle information recorder 13 is configured using an HDD, an SSD, or the like.

The charger 14 is electrically connected to the charging stand 20 via a charging/discharging cable (not illustrated) under the control of the ECU 16. The charger 14 converts DC power or AC power having a predetermined voltage value supplied from the charging stand 20 into a voltage value and DC power corresponding to the battery 15, and outputs the converted power to the battery 15. The charger 14 is configured of, for example, an inlet, an inverter, and the like.

The battery 15 is configured using, for example, a chargeable and dischargeable storage battery such as a nickel hydrogen battery or a lithium ion battery, an energy storage device such as an electric double layer capacitor, or the like. The battery 15 stores or discharges the DC power from the charger 14.

The ECU 16 is configured of a memory and a processor having hardware such as a central processing unit (CPU). The ECU 16 controls the operation of each unit included in the electric vehicle 10.

Configuration of Charging Stand

Next, a configuration of the charging stand 20 will be described. The charging stand 20 includes a transmitter/receiver 21, a charging device 22, a charging device information recorder 23, and a stand controller 24.

Under the control of the stand controller 24, the transmitter/receiver 21 transmits various types of information to the charge control device 30 and receives various types of information from the charge control device 30 via the network N100. Specifically, the transmitter/receiver 21 transmits charging stand information regarding the charging stand 20 to the charge control device 30 under the control of the stand controller 24. Here, charging stand information includes position information of the charging stand 20, model information indicating one of a quick charging method and a normal charging method of the charging device 22 in the charging stand 20, the number of charging devices 22 installed, and a current operating state of the charging stand 20. The transmitter/receiver 21 is configured using a communication module or the like capable of transmitting and receiving various types of information.

The charging device 22 is electrically connected to the charger 14 of the electric vehicle 10, and supplies AC power or DC power under the control of the stand controller 24. The charging device 22 is configured using a normal charger or a quick charger. Note that while FIG. 2 describes a case where one charging device 22 is provided in the charging stand 20, the present disclosure is not limited thereto, and a plurality of charging devices may be provided.

The charging device information recorder 23 records identification information for identifying the charging stand 20, the number of charging devices 22 installed in the charging stand 20, position information of the charging stand 20, type information (normal charging method or quick charging method) of the charging device 22, a program executed by the charging stand 20, and the like. The charging device information recorder 23 is configured using an HDD, an SSD, or the like.

The stand controller 24 is configured of a memory and a processor having hardware such as a central processing unit (CPU). The stand controller 24 controls the operation of each unit included in the charging stand 20.

Configuration of Charge Control Device

Next, a configuration of the charge control device 30 will be described. The charge control device 30 includes a transmitter/receiver 31, a recorder 32, and a server controller 33.

Under the control of the server controller 33, the transmitter/receiver 31 transmits various types of information to the electric vehicle 10 and the charging device 22 and receives various types of information from the electric vehicle 10 and the charging device 22 via the network N100. The transmitter/receiver 31 is configured using a communication module or the like capable of transmitting and receiving various types of information.

The recorder 32 includes a program recorder 321 that records various types of programs executed by the charge control device 30, and a charging stand information recorder 322 that records charging stand information regarding the charging stand 20. Here, charging stand information includes at least position information of the charging stand 20, the number of charging devices 22 installed in the charging stand 20, and type information indicating that the charging device 22 is of either the normal charging method or the quick charging method.

The server controller 33 is configured using a memory and a processor having hardware such as a CPU, and the server controller 33 reads and executes a program recorded in the program recorder 321 in a work area of the memory, and controls each component and the like through the execution of the program by the processor. As a result, the hardware and the software cooperate with each other, and the server controller 33 implements a functional module matching a predetermined purpose. Specifically, the server controller 33 includes an acquisition unit 331, a calculator 332, a determination unit 333, an output controller 334, and a search unit 335 as functional modules. Note that in the embodiment, the server controller 33 functions as a processor.

For each charging stand 20, the acquisition unit 331 acquires a plurality of pieces of vehicle information from a plurality of other electric vehicles 10 that are likely to be charged within a predetermined range (e.g., three kilometers) from the charging stand 20.

The calculator 332 calculates a congestion prediction value for each charging stand 20 on the basis of the plurality of pieces of vehicle information acquired by the acquisition unit 331 and the charging station information recorded by the charging stand information recorder 322.

The determination unit 333 performs congestion prediction determination for each charging stand 20 on the basis of the congestion prediction value for each charging stand 20 calculated by the calculator 332.

The output controller 334 outputs charge limit information for each charging stand 20 whose congestion prediction value is equal to or greater than a predetermined value. Further, the output controller 334 outputs charge limit cancellation information for each charging stand 20 whose congestion prediction value is less than the predetermined value.

On the basis of the charging stand information recorded by the charging stand information recorder 322, the position information included in the vehicle information of the electric vehicle 10 whose destination is set to the charging stand 20 whose congestion prediction value is equal to or greater than the predetermined value, and the SoC of the battery 15, the search unit 335 searches for another charging stand candidate that can provide full charging other than the charging stand 20 at the destination.

Processing of Charge Control Device

Figure 3:
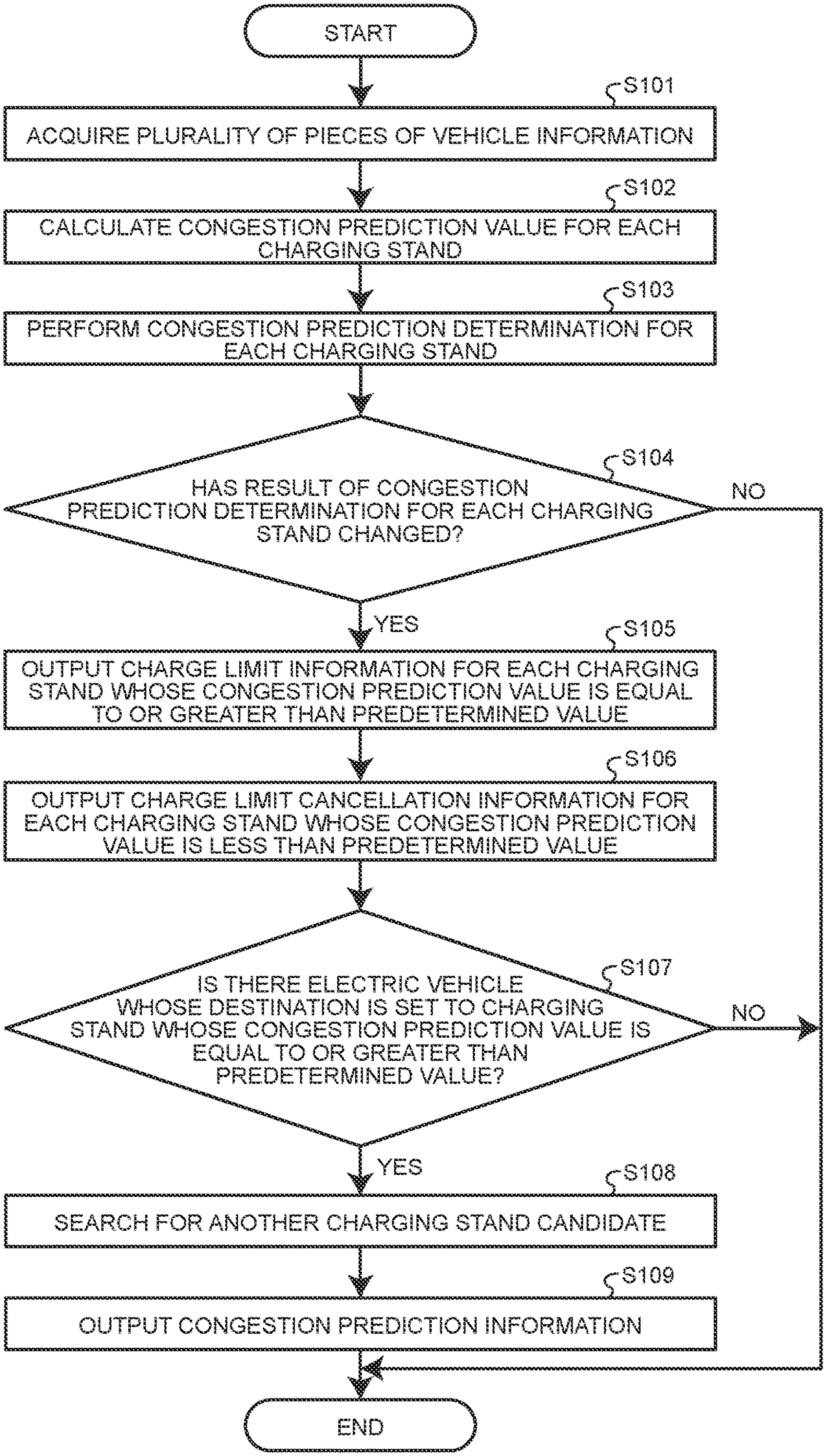
FIG. 3 is a flowchart illustrating an outline of processing executed by a charge control device according to the embodiment.

Next, processing executed by the charge control device will be described. FIG. 3 is a flowchart illustrating an outline of processing executed by the charge control device 30.

As illustrated in FIG. 3, first, for each charging stand 20, the acquisition unit 331 acquires a plurality of pieces of vehicle information from a plurality of other electric vehicles 10 that are likely to be charged within a predetermined range (e.g., three kilometers) from the charging stand 20 (step S101).

Subsequently, the calculator 332 calculates a congestion prediction value for each charging stand 20 on the basis of the plurality of pieces of vehicle information acquired by the acquisition unit 331 and the charging station information recorded by the charging stand information recorder 322 (step S102). Specifically, first, the calculator 332 detects, for each of the charging stands the number of electric vehicles 10 located within a predetermined range from the charging stand 20 and likely to be charged, on the basis of the plurality of pieces of vehicle information acquired by the acquisition unit 331, and calculates, as the congestion prediction value, a value obtained by dividing the detected number by the number of charging devices 22 in one charging stand 20 ((number of electric vehicles)/(number of charging devices 22 installed in charging stand 20)=K). Here, the electric vehicle 10 that is likely to be charged is at least one of the electric vehicle 10 whose SoC of the battery 15 is equal to or less than 80% and the electric vehicle 10 whose destination is set to the charging stand 20.

Thereafter, the determination unit 333 performs congestion prediction determination for each charging stand on the basis of the congestion prediction value for each charging stand 20 calculated by the calculator 332 (step S103). Specifically, the determination unit 333 determines whether the congestion prediction value for each charging stand 20 is equal to or greater than a predetermined value (e.g., 1.5) (K>1.5), determines that the charging stand whose congestion prediction value is equal to or greater than the predetermined value is congested, and determines that the charging stand 20 whose congestion prediction value is not equal to or greater than the predetermined value is not congested.

Subsequently, the output controller 334 determines whether or not the result of the latest congestion prediction determination for each charging stand 20 by the determination unit 333 has changed from the result of the congestion prediction determination for each charging stand by the determination unit 333 a predetermined time ago (step S104). If the output controller 334 determines that the result of the latest congestion prediction determination for each charging stand 20 by the determination unit 333 has changed from the result of the congestion prediction determination for each charging stand by the determination unit 333 a predetermined time ago (step S104: Yes), the output controller 334 outputs charge limit information for each charging stand 20 whose congestion prediction value is equal to or greater than the predetermined value (step S105), and outputs charge limit cancellation information for each charging stand 20 whose congestion prediction value is less than the predetermined value (step S106). Here, charge limit information includes an instruction signal for limiting the target charging amount of the electric vehicle 10 by the charging stand 20 to less than a charging amount at which the charging efficiency decreases. After step S106, the charge control device 30 proceeds to step S107. On the other hand, if the output controller 334 determines that the result of the latest congestion prediction determination for each charging stand 20 by the determination unit 333 has not changed from the result of the congestion prediction determination for each charging stand 20 by the determination unit 333 a predetermined time ago (step S104: No), the charge control device 30 ends the processing.

Figure 4:
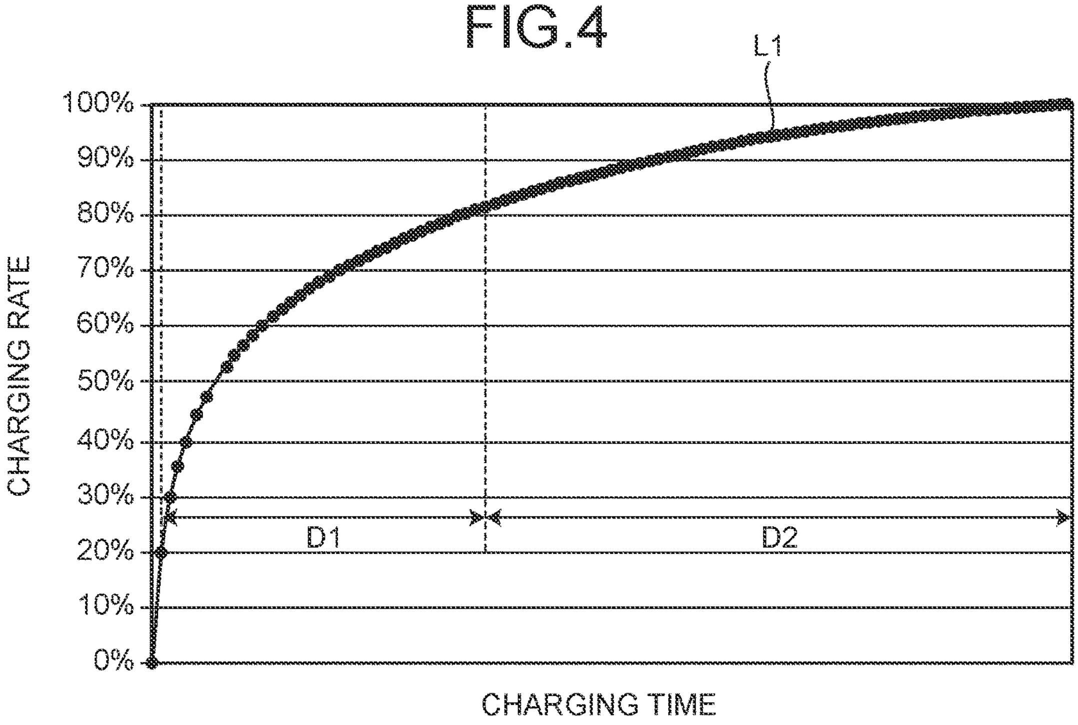
FIG. 4 is a diagram illustrating a relationship between a charging time and a charging rate of a battery in an electric vehicle according to the embodiment.

FIG. 4 is a diagram illustrating a relationship between a charging time and a charging rate of the battery in the electric vehicle 10. In FIG. 4, the horizontal axis represents the charging time, and the vertical axis represents the charging rate (SoC). A curve L1 indicates the relationship between the charging time and the charging rate.

As indicated by the curve L1, the charging time is set such that a charging time D1 required for a charging rate within a predetermined range, such as a charging rate up to 80%, is shorter than a charging time D2 required for charging to the full capacity (SoC 100%) exceeding the predetermined range. That is, the charging efficiency decreases when the charging rate exceeds a predetermined range. Therefore, when the congestion prediction value of the charging stand 20 is equal to or greater than the predetermined value, the output controller 334 outputs charge control information including an instruction signal for limiting the target charging amount of the electric vehicle 10 by the charging stand 20 to less than a charging amount at which the charging efficiency decreases to the charging stand 20 whose congestion prediction value is equal to or greater than the predetermined value.

Returning to FIG. 3, the description of step S107 and subsequent steps will be continued.

In step S107, the determination unit 333 determines whether or not there is an electric vehicle 10 whose destination is set to the charging stand 20 whose congestion prediction value is equal to or greater than the predetermined value on the basis of the plurality of pieces of vehicle information acquired by the acquisition unit 331. If the determination unit 333 determines that there is the electric vehicle 10 whose destination is set to the charging stand 20 whose congestion prediction value is equal to or greater than the predetermined value (Step S107: Yes), the charge control device 30 proceeds to Step S108. On the other hand, if the determination unit 333 determines that there is no electric vehicle 10 whose destination is set to the charging stand 20 whose congestion prediction value is equal to or greater than the predetermined value (step S107: No), the charge control device 30 ends the processing.

In step S108, on the basis of the charging stand information recorded by the charging stand information recorder 322, the position information included in the vehicle information of the electric vehicle 10 whose destination is set to the charging stand 20 whose congestion prediction value is equal to or greater than the predetermined value, and the SoC of the battery 15, the search unit 335 searches for another charging stand candidate that can provide full charging other than the charging stand 20 at the destination.

The output controller 334 outputs congestion prediction information to the electric vehicle 10 whose destination is set to the charging stand 20 whose congestion prediction value is equal to or greater than the predetermined value (step S109). Here, congestion prediction information includes, regarding the charging stand 20 set as the destination, charge limit information indicating that the charging amount is limited to less than a charging amount at which the charging efficiency decreases, and chargeable information regarding other charging stand candidates that can provide full charging searched by the search unit 335. After step S109, the charge control device 30 ends the processing.

Processing of Charging Stand

Figure 5:
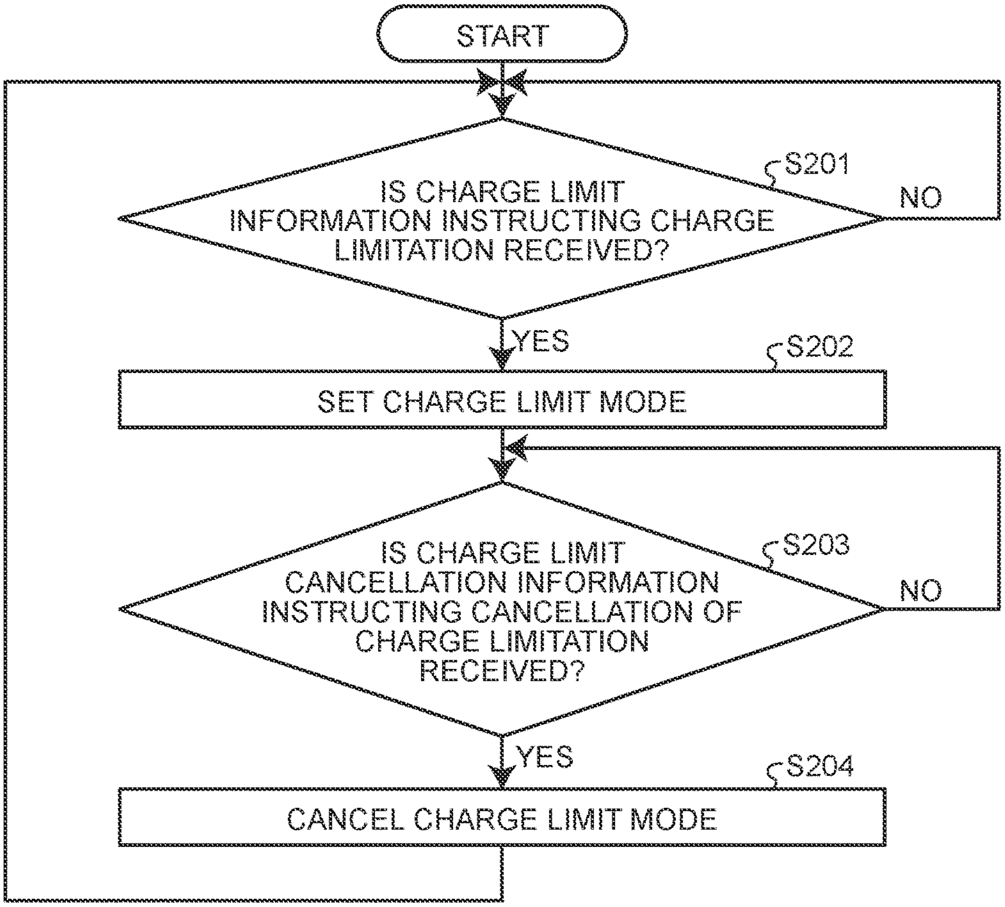
FIG. 5 is a flowchart illustrating an outline of processing executed by a charging stand according to the embodiment.

Next, processing executed by the charging stand 20 will be described. FIG. 5 is a flowchart illustrating an outline of processing executed by the charging stand 20.

As illustrated in FIG. 5, first, when charge limit information instructing charge limitation is received from the charge control device 30 (step S201: Yes), the stand controller 24 sets charging of the electric vehicle 10 by the charging device 22 to a charge limit mode (step S202).

Subsequently, when charge limit cancellation information instructing cancellation of the charge limitation is received from the charge control device 30 (step S203: Yes), the stand controller 24 cancels the limit mode of charging the electric vehicle 10 by the charging device 22 (step S204). After step S204, the charging stand returns to step S201.

If charge limit information instructing charge limitation is not received from the charge control device in step S201 (step S201: No), the stand controller 24 repeats this determination at predetermined time intervals.

If charge limit cancellation information instructing cancellation of the charge limitation is not received from the charge control device 30 in step S203 (step S203: No), the stand controller 24 repeats this determination at predetermined time intervals.

Processing of Electric Vehicle

Figure 6:
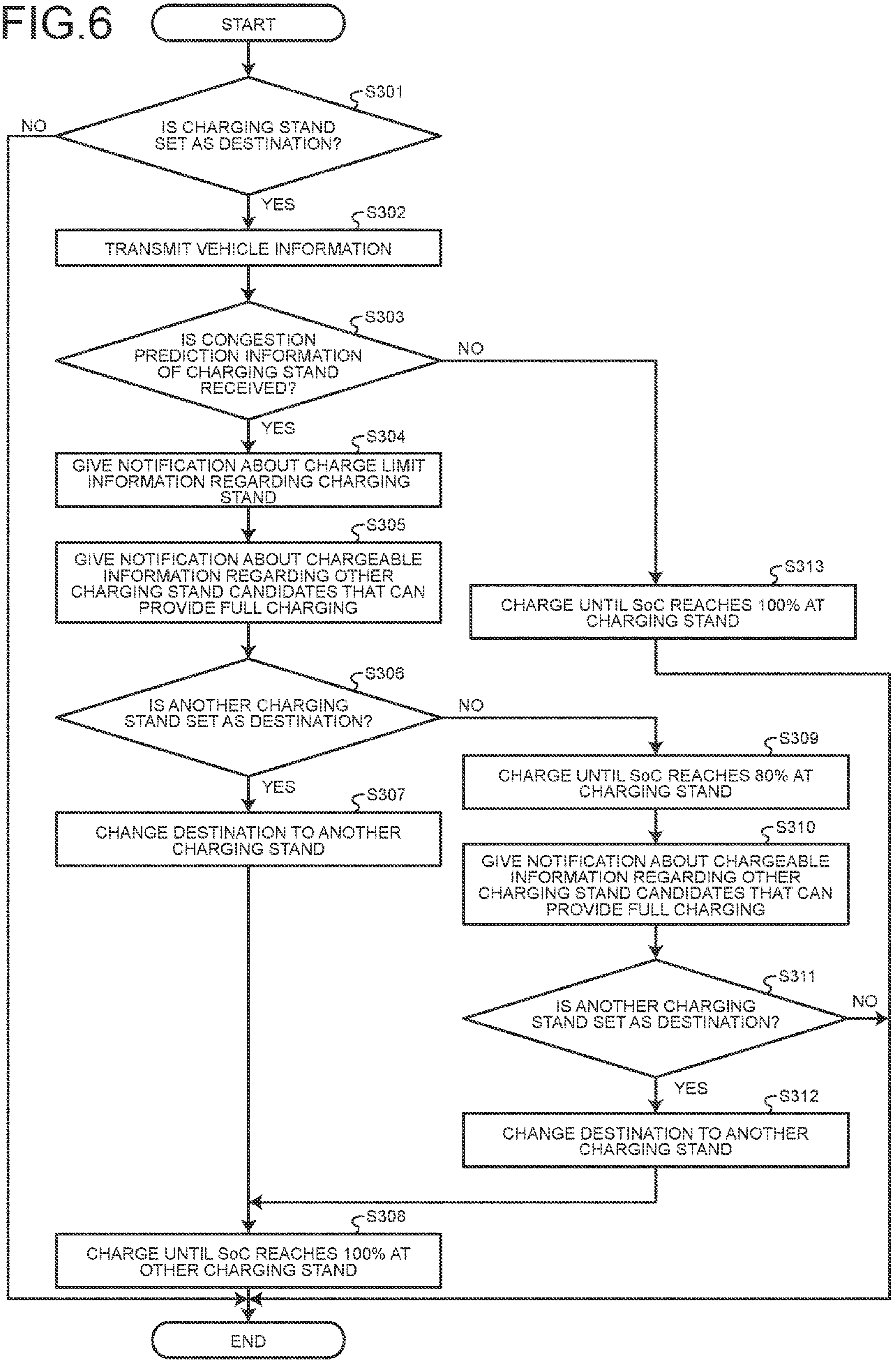
FIG. 6 is a flowchart illustrating an outline of processing executed by the electric vehicle according to the embodiment.

Next, processing executed by the electric vehicle 10 will be described. FIG. 6 is a flowchart illustrating an outline of processing executed by the electric vehicle 10.

As illustrated in FIG. 6, first, when the user sets the charging stand 20 as the destination of the electric vehicle 10 via the navigation system 11 (step S301: Yes), the ECU 16 transmits vehicle information to the charge control device 30 via the transmitter/receiver 12 (step S302).

Subsequently, when receiving congestion prediction information of the charging stand 20 set as the destination from the charge control device 30 (step S303: Yes), the ECU 16 causes the navigation system 11 to give notification about charge limit information regarding the charging stand (hereinafter simply referred to as "set charging stand 20") set as the destination of the electric vehicle 10 via the navigation system 11 (step S304). In this case, the ECU 16 may cause a display monitor of a communication device such as a mobile phone associated with a user of the electric vehicle 10 to output the charge limit information as a notification.

Thereafter, on the basis of congestion prediction information, the ECU 16 causes the navigation system 11 to give notification about chargeable information regarding other charging stand candidates that can fully charge the electric vehicle 10 (step S305). That is, since it is predicted that the number of users is large in the charging stand 20 that can provide quick charging, another charging stand 20 that can provide full charging and normal charging is presented. Accordingly, the user of the electric vehicle 10 can know the charging stand 20 that can provide full charging. As a result, it is possible to avoid congestion due to charging by distributing users who gather for quick charging to other charging stands 20.

Subsequently, when the user sets another charging stand 20 as the destination of the electric vehicle 10 via the navigation system 11 (step S306: Yes), the ECU 16 changes the destination of the electric vehicle 10 to another charging stand 20 that can provide full charging (step S307).

Thereafter, after arriving at the other charging stand that can fully charge the electric vehicle 10, the ECU 16 charges the battery 15 until the SoC reaches 100% (step S308). After step S308, the electric vehicle 10 ends the processing.

In step S306, when the user has not set another charging stand 20 as the destination of the electric vehicle 10 via the navigation system 11 by the ECU 16 (step S306: No), after arriving at the charging stand 20 set as the destination, the battery 15 is charged until the SoC reaches 80% (step S309).

Subsequently, the ECU 16 causes the navigation system 11 to give notification about chargeability information regarding other charging stand candidates that can fully charge the electric vehicle 10 (step S310).

Thereafter, when the user sets another charging stand as the destination of the electric vehicle 10 via the navigation system 11 (step S311: Yes), the ECU 16 changes the destination of the electric vehicle 10 to another charging stand 20 that can provide full charging (step S312). After step S312, the electric vehicle 10 proceeds to step S308.

In step S311, when the user has not set another charging stand 20 as the destination of the electric vehicle 10 via the navigation system 11 (step S311: No), the electric vehicle 10 ends the processing.

In step S303, when congestion prediction information of the charging stand 20 set as the destination is not received from the charge control device 30 (step S303: No), after the electric vehicle 10 arrives at the charging stand set as the destination, the ECU 16 charges the battery until the SoC reaches 100% (step S313). After step S313, the electric vehicle 10 ends the processing.

In step S301, when the user has not set the charging stand 20 as the destination of the electric vehicle 10 via the navigation system 11 (step S301: No), the electric vehicle 10 ends the processing.

According to the embodiment described above, in a case where there is another vehicle electric vehicle 10 that is likely to be charged within a predetermined range from the charging stand 20, the server controller 33 limits the target charging amount of the electric vehicle 10 by the charging stand 20 to less than a charging amount at which the charging efficiency decreases. This makes it possible to avoid congestion due to charging.

In addition, according to the embodiment, the server controller 33 outputs, to the electric vehicle 10 and other electric vehicles 10, charge limit information indicating that the charging amount is limited to less than the charging amount at which the charging efficiency decreases, and outputs, to the electric vehicle 10, after using the charging stand 20, chargeable information related to charging stand candidates regarding other charging stands 20 that can provide full charging. As a result, the user who uses a crowded charging stand 20 can grasp another charging stand 20 that can provide full charging after charging the battery 15 to less than a charging amount at which its charging efficiency decreases. Further, the user of another electric vehicle 10 can grasp the congestion state of the charging stand 20 he/she plans to use.

In addition, according to the embodiment, when determining that the congestion prediction value of the charging stand 20 is equal to or greater than a predetermined value, the server controller 33 limits the target charging amount of the electric vehicle 10 by the charging stand 20 to less than the charging amount at which the charging efficiency decreases. On the other hand, when determining that the congestion prediction value of the charging stand 20 is not equal to or greater than the predetermined value, the server controller 33 stops limiting the target charging amount of the electric vehicle 10 by the charging stand 20 to less than the charging amount at which the charging efficiency decreases. As a result, it is possible to efficiently charge a plurality of electric vehicles 10 while avoiding congestion due to charging.

In addition, according to the embodiment, since the vehicle information includes position information regarding the current position of the electric vehicle 10, destination information regarding the destination, and charge state information regarding the charge state of the battery 15, it is possible to accurately calculate the congestion prediction value of the charging stand 20.

Other Embodiments

In addition, in one embodiment, the above-described "unit" can be replaced with a "circuit" or the like. For example, the controller can be replaced with a control circuit.

Furthermore, in one embodiment, the function of the server controller 33 may be provided in the stand controller 24 of the charging stand 20 and the ECU 16 of the electric vehicle 10. That is, in one embodiment, the functions of the server controller 33; the acquisition unit 331, the calculator 332, the determination unit 333, the output controller 334, and the search unit 335 may be provided in the stand controller 24 of the charging stand 20 and the ECU 16 of the electric vehicle 10.

In addition, the program to be executed by the charge control device according to the embodiment is provided by being recorded as file data in an installable format or an executable format in a computer-readable recording medium such as a CD-ROM, a flexible disk (FD), a CD-R, a digital versatile disk (DVD), a USB medium, or a flash memory.

In addition, the program to be executed by the charge control device according to the embodiment may be stored on a computer connected to a network such as the Internet and provided by being downloaded via the network.

Note that in the description of the flowcharts in the present specification, the context of processing between steps is clearly indicated using expressions such as "first", "thereafter", and "subsequently", but the order of processing required to implement the present embodiment is not uniquely determined by these expressions. That is, the order of processing in the flowcharts described in the present specification can be changed as long as there is no inconsistency.

Further effects and modifications can be easily derived by those skilled in the art. Broader aspects of the disclosure are not limited to the specific details and representative embodiments presented and described above. Accordingly, various changes may be made without departing from the spirit or scope of the general concept as defined by the appended claims and their equivalents.

While some of the embodiments of the present application have been described in detail with reference to the drawings, these are merely examples, and the present disclosure can be implemented in other forms subjected to various modifications and improvements on the basis of the knowledge of those skilled in the art, including the aspects described in the disclosure of the present disclosure.

According to the present disclosure, an effect of avoiding congestion due to charging can be attained.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charge control device for an electric vehicle, the charge control device comprising a processor having hardware, wherein the processor is configured to acquire vehicle information including a current position, a destination, and a state of charge (SoC) of the electric vehicle;

calculate a congestion prediction value for a charging stand by dividing a number of other electric vehicles that are located within a predetermined range from the charging stand and that either have an SoC of 80% or less or have set the charging stand as a destination, by a number of charging devices installed in the charging stand;

limit, when the congestion prediction value is equal to or greater than a predetermined value , a target charging amount of the electric vehicle by the charging stand to less than an SoC of 80%, which is a threshold at which charging efficiency decreases; and search for another charging stand candidate that can provide full charging and output a notification to the electric vehicle after the limiting is performed.

* * * * *